United States Patent [19]

Simpson

[11] Patent Number: 4,460,707
[45] Date of Patent: Jul. 17, 1984

[54] HYDROPROCESSING CATALYST AND METHOD FOR PREPARING IT

[75] Inventor: Howard D. Simpson, Irvine, Calif.

[73] Assignee: Union Oil Company of California, Los Angeles, Calif.

[21] Appl. No.: 453,991

[22] Filed: Dec. 28, 1982

[51] Int. Cl.³ .................. B01J 21/04; B01J 23/85; B01J 23/88
[52] U.S. Cl. .................. 502/315; 502/313; 502/314; 208/216 PP; 208/251 H
[58] Field of Search .................. 252/465; 208/216 PP, 208/251 H; 502/313, 314, 315

[56] References Cited

U.S. PATENT DOCUMENTS

| | | | |
|---|---|---|---|
| 3,393,148 | 7/1968 | Bertolacini et al. | 208/264 |
| 3,819,509 | 6/1974 | Wolk et al. | 208/216 R |
| 3,876,523 | 4/1975 | Rosinski et al. | 208/216 PP |
| 3,898,155 | 8/1975 | Wilson | 208/216 R |
| 3,901,792 | 8/1975 | Wolk et al. | 208/210 |
| 3,928,176 | 12/1975 | Hamner et al. | 208/97 |
| 3,931,052 | 1/1976 | Oleck et al. | 252/465 |
| 3,985,684 | 10/1976 | Arey et al. | 252/469 |
| 4,048,060 | 9/1977 | Riley | 208/210 |
| 4,119,531 | 10/1978 | Hopkins et al. | 208/251 H |
| 4,188,284 | 2/1980 | Quick et al. | 208/216 PP |
| 4,267,033 | 5/1981 | Heck et al. | 208/216 PP |
| 4,328,127 | 5/1982 | Angevine et al. | 252/439 |

OTHER PUBLICATIONS

U.S. Patent Application Ser. No. 395,832 filed Jul. 6, 1982, by Howard D. Simpson and Dennis P. McArthur.

Primary Examiner—W. J. Shine
Attorney, Agent, or Firm—Dean Sandford; Gregory F. Wirzbicki; Alan H. Thompson

[57] ABSTRACT

Hydroprocessing of hydrocarbon oils is carried out utilizing a catalyst containing active metal components on a porous refractory oxide and having a narrow pore size distribution, with essentially all pores being of diameter greater than about 100 angstroms, with less than about 10 percent of the total pore volume being in pores of diameter greater than 300 angstroms, and with at least about 60 percent of the total pore volume being in pores of diameter from about 180 to about 240 angstroms. The catalyst is particularly useful for removing of contaminant metals from residuum hydrocarbon oils.

47 Claims, No Drawings

HYDROPROCESSING CATALYST AND METHOD FOR PREPARING IT

BACKGROUND OF THE INVENTION

1. Field of the Invention

This invention relates to catalysis, and particularly to hydrocarbon hydroprocessing catalysts, such as those utilized to catalyze the reaction of hydrogen with organosulfur, organonitrogen, organometallic and asphaltene compounds. More particularly, this invention relates to a hydroprocessing catalyst and a process for utilizing the catalyst for hydrodesulfurizing, hydrodemetallizing and converting asphaltene compounds in hydrocarbon liquids.

2. Description of the Prior Art

In a typical catalytic hydrocarbon refining process, contaminant metals contained in a hydrocarbon oil deposit on porous refining catalysts, causing a gradual loss of catalytic activity and/or selectivity for yielding an intended product. Residual petroleum oil fractions, such as the heavy fractions produced in atmospheric and vacuum crude distillation columns, are especially undesirable as feedstocks for most catalytic refining processes due to their high metals, asphaltene and sulfur content. Economic considerations, however, have recently provided new incentives for catalytically converting the heavy fractions to more marketable products.

Methods are available to reduce the sulfur, metals and asphaltene content of residua. One such method is hydrodesulfurization, a process wherein a residuum, usually containing the bulk of the asphaltene components of the original crude from which the residuum was derived, is contacted with a catalyst usually containing hydrogenation metals on a porous refractory oxide support under conditions of elevated temperature and pressure and in the presence of hydrogen such that the sulfur components are converted to hydrogen sulfide, and the asphaltene components to lower molecular weight molecules while the metals are simultaneously deposited on the catalyst. However, the deposition of contaminant metals on the catalyst causes deactivation of the catalyst, and, in the usual instance, the extent of deactivation is a function of the amount of metals deposition on the catalyst surface, i.e., the usefulness of the catalyst steadily decreases as the amount of deposited metals increases with continued treatment of the residuum.

It has been recognized that typical hydroprocessing catalysts, especially those utilized for hydrodesulfurization purposes, have specific pore size characteristics effective for catalytic processing of residuum. For example, a catalyst employed in a two-catalyst hydrodesulfurization process ordinarily includes at least one desulfurization catalyst having a sizable number of pores of diameter less than 100 angstroms. Although such a catalyst often exhibits high desulfurization activity, its useful life is manifestly short in the absence of a catalyst promoting metals removal. Conversely, many catalysts exhibiting a suitable degree of demetallation activity tend to have a sizable number of pores having a diameter greater than 300 angstroms. The hydrodesulfurization processes disclosed in U.S. Pat. Nos. 3,819,509 and 3,901,792 are typical of a catalyst having relatively small pore characteristics (i.e. some pore diameters less than 100 angstroms) for desulfurization and a second relatively large pore catalyst additionally promoting metals removal.

Although conventional catalysts, including those containing both large pores (i.e., greater than 300 angstroms pore diameters) and small pores (i.e., less than 100 angstroms pore diameters) are somewhat active and stable for hydrocarbon conversion reactions, catalysts of yet higher activities and stabilities are still being sought. Increasing the activity of a catalyst increases the rate at which a chemical reaction proceeds under given conditions, and increasing the stability of a catalyst increases its resistance to deactivation, that is, the useful life of the catalyst is extended. In general, as the activity of a catalyst is increased, the conditions required to produce a given end product, such as a hydrocarbon of given sulfur, asphaltene, and/or contaminant metals content, become more mild. Milder conditions require less energy to achieve the desired product, and catalyst life is extended due to such factors as lower coke formation or the deposition of less metals.

Presently, conventional catalysts employed to promote a suitable degree of hydrodesulfurization of a hydrocarbon oil tend to have limited capability for also removing contaminant metals and/or converting asphaltenes to less complex components. Although, such conventional catalysts may be active for removing sulfur, the useful life of such catalysts may be relatively short when high demetallization activity and/or asphaltene conversion is also emphasized.

A need still exists for a highly active hydroprocessing catalyst with an extended useful life when employed to promote hydrocarbon conversion reactions, particularly hydrodesulfurization, hydrodemetallization and/or hydroconversion of asphaltenes.

Accordingly, it is an object of the present invention to provide a novel hydroprocessing catalyst that is highly active and still has a long useful life when employed in catalytic hydrocarbon conversion processes to promote the upgrading of a hydrocarbon oil, particularly with respect to removing contaminant metals in addition to sulfur compounds.

It is another object to provide a novel catalyst that may be employed in a process for hydrodesulfurizing a hydrocarbon oil while maintaining a high degree of demetallization.

It is still another object of the invention to provide a novel catalyst for hydrodemetallizing a hydrocarbon oil and specifically, to provide a novel catalyst with a high capacity for accumulating contaminant metals.

It is a further object of the invention to provide novel processes for the hydrodemetallization, hydrodesulfurization and hydroconversion of asphaltenes found in heavy hydrocarbon oil fractions.

These and other objects and advantages of the invention will become apparent from the following description.

SUMMARY OF THE INVENTION

The present invention is directed to a catalyst and a process for the catalytic hydroprocessing of a hydrocarbon oil. The catalyst has a narrow pore size distribution wherein essentially all the pores are of diameter greater than 100 angstroms, less than 10 percent of the total pore volume is in pores of diameter greater than 300 angstroms, and at least about 60 percent of the total pore volume is in pores of diameter between about 180 and about 240 angstroms. Generally, the catalyst contains one or more active metal components, typically Group VIB and Group VIII hydrogenation metal components in combination, on a porous refractory oxide support material usually containing alumina. Ordinarily, the catalyst is utilized to enhance the removal of substantial amounts of metal contaminants in addition to conversion of asphaltenes and sulfur compounds from a metals-containing hydrocarbon oil.

In one embodiment, the catalyst has a surface area between about 100 m$^2$/gram and about 200 m$^2$/gram and a total pore volume between about 0.25 cc/gram and about 1.2 cc/gram. When employed in the hydroprocessing of a metals-containing hydrocarbon oil, the catalyst is highly active and stable, due in part to a particularly large capacity for accumulating contaminant metals.

DETAILED DESCRIPTION OF THE INVENTION

The invention is directed to a hydroprocessing catalyst comprising active metals on a support, and more preferably, to hydrodesulfurization catalysts comprising Group VIII and VIB active metal components on a non-zeolitic support comprising porous refractory oxide material. The catalyst of the invention is particularly well suited for hydrodesulfurization wherein the desired result is desulfurization coupled with a high degree of hydroconversion of asphaltenes and/or hydrodemetallation of a hydrocarbon oil containing a high content of metallic contaminants, asphaltenes and sulfur.

Porous refractory oxides useful in the present hydroprocessing catalysts include silica, magnesia, silica-magnesia, zirconia, silica-zirconia, titania, silica-titania, etc. Mixtures of the foregoing oxides are also contemplated, especially when prepared as homogeneously as possible. The preferred refractory oxide material, however, comprises aluminum and is usually selected from the group consisting of alumina, lithium-alumina, phosphorus-alumina, lithium-phosphorus-alumina, and silica-alumina. When employed in the preparation of catalysts promoting hydrocarbon conversion processes such as hydrodesulfurization, hydrodemetallization and hydroconversion of asphaltenes, transition aluminas such as gamma alumina, delta alumina and theta alumina are highly preferred refractory oxides. It is most highly preferred that the porous refractory oxide contaain at least about 90, and even more preferably at least about 95 weight percent of gamma alumina.

The support material is usually prepared in the form of shaped particulates by methods well known in the art, with the preferred method being to extrude a precursor of the desired support, as for example, an inorganic refractory oxide gel such as a spray-dried or peptized alumina gel, through a die having openings therein of desired size and shape, after which the extruded matter is cut into extrudates of desired length. The particles have a symmetrical cross-sectional shape, and the average length of the particles is at least twice that of the cross-sectional diameter. The cross-sectional diameter is herein considered as the longest dimension on the cross-section taken perpendicular to the longest axis of symmetry of the particle. Preferred refractory oxide particles have cross-sectional shapes that are cylindrical or have protrusions (lobes) from a central area, such as polylobes. The cross-sectional diameter of the particles is usually about 1/40 to about ⅛ inch, preferably about 1/32 to about 1/12 inch, and most preferably about 1/24 to about 1/15 inch. Among the preferred refractory oxide particles, at least for hydroprocessing, are those having cross-sectional shapes resembling that of a three-leaf clover, as shown, for example, in FIGS. 8 and 8A of U.S. Pat. No. 4,028,227. Preferred clover-shaped particulates are such that each "leaf" of the cross-section is defined by about a 270° arc of a circle having a diameter between about 0.02 and 0.04 inch. More preferred particulates are those having cross-sectional shapes that are quadralobal, as in FIG. 10 of U.S. Pat. No. 4,028,227, and most preferably, when the lobes arise from circles of equal diameter having their centers at the vertices of a rhombus having diagonals intersecting at the center of the cross-section.

Support particles prepared by the foregoing or equivalent procedures are generally precalcined, especially if gamma alumina is the chosen support material. Temperatures above about 900° F. are usually required to convert alumina gel or hydrated alumina particulates to gamma alumina. Typically, temperatures between about 1,100° F. and 1,500° F. are utilized to effect this transformation, with holding periods of ¼ to 3 hours generally being effective.

Physical characteristics of the support particles utilized to prepare the catalyst of the invention typically include a narrow pore size distribution wherein essentially all the pores are of diameter greater than 100 angstroms, less than about 10 percent of the total pore volume is in pores of diameter greater than 300 angstroms, and at least about 60 percent, preferably at least about 65 percent, of the total pore volume is in pores of diameter distributed over a narrow range of about 60 angstroms within the 100 angstrom range of about 140 to about 240 angstroms, as determined by conventional mercury porosimeter testing methods.

Since the present catalysts require at least 60 percent of their pore volume to be in pores of 180 to 240 angstrom diameter, it will be seen from the foregoing that, in the preparation of the catalysts of the present invention, the support particles may initially have a similar distribution of pore volume as the final catalyst, but such is not necessary or critical. As will be shown hereinafter in Example I, the support particles may have, for example, at least 60 percent of their pore volume in pores of 140 to 200 angstrom diameter and yet still, due to the subsequent impregnations, calcinations, and other catalyst preparational steps hereinafter discussed, yield a final catalyst having, as required herein, at least 60 percent of the pore volume in pores of 180 to 240 angstrom diameter.

Other characteristics of supports utilized herein include a total pore volume, an average pore diameter and surface area large enough to provide substantial space and area to deposit the active metal components. The total pore volume of the support, as measured by the conventional mercury/helium differential density method, is usually about 0.5 to about 2.0 cc/gram, preferably about 0.5 to about 1.5 cc/gram, and most preferably about 0.7 to about 1.1 cc/gram. The average pore diameter of the support is usually greater than about 160 angstroms, and preferably from about 160 to about 220 angstroms. Additionally, the surface area (as measured by the B.E.T. method) of the support particles is above about 100 m$^2$/gram, usually from about 100 m$^2$/gram to about 300 m$^2$/gram, and preferably about 125 m$^2$/gram to about 275 m$^2$/gram.

Support particles having the preferred physical characteristics disclosed herein are commercially available from Armak Catalyst Division of Akzona, Inc.

To prepare the hydroprocessing catalyst, the support material is compounded, as by impregnation of calcined support particles, with one or more precursors of a catalytically active metal or metals. The impregnation may be accomplished by any method known in the art, as for example, by spray impregnation wherein a solution containing the metal precursors in dissolved form is sprayed onto the support particles. Another method is the circulation or multi-dip procedure wherein the support material is repeatedly contacted with the impregnating solution with or without intermittent drying. Yet another method involves soaking the support in a relatively large volume of the impregnation solution, and yet one more method, the preferred method, is the pore volume or pore saturation technique wherein support particles are introduced into an impregnation solution of volume just sufficient to fill the pores of the support. On occasion, the pore saturation technique may be modified so as to utilize an impregnation solution having a volume between 10 percent less and 10 percent more than that which will just fill the pores.

If the active metal precursors are incorporated by impregnation, a subsequent or second calcination, as for example, at temperatures between 900° F. and 1,400° F., converts the metals to their respective oxide forms. In some cases, subsequent calcinations may follow the impregnation of individual active metals. Subsequent calcinations, however, may be avoided in alternative embodiments of the invention, as for example, by co-mulling the active metals with the support material rather than impregnating the metals thereon. In comulling, the precursor of the support material, usually in a hydrated or gel form, is admixed with precursors of the active metal components, either in solid form or in solution, to produce a paste suitable for shaping by known methods, e.g., pelleting, extrusion, etc. A subsequent calcination yields a hydroprocessing catalyst containing the active metals in their respective oxide forms.

When the hydroprocessing catalyst is prepared by the foregoing or equivalent methods, at least one active metal component is usually selected and typically from the Group VIB and VIII metals of the Periodic Table of Elements. Preferably, the catalyst contains both a Group VIB and VIII element, with nickel and cobalt being the preferred Group VIII metals and molybdenum and tungsten being the preferred Group VIB metals, and with cobalt and molybdenum in combination being the most preferred active metals for a hydrodesulfurization catalyst, and particularly for hydrodemetallization. Also, nickel and tungsten in combination are highly preferred for hydroconversion of asphaltene compounds. The hydroprocessing catalyst contains up to about 10, usually from 1 to 8 percent, and preferably from 2 to 6 percent by weight of the Group VIII metal, calculated as the monoxide, and up to about 30, usually from about 3 to about 28 percent, and preferably from 8 to 26 percent by weight of the Group VIB metal, calculated as the trioxide.

In accordance with the invention, a hydroprocessing catalyst is prepared so as to have a narrow pore size distribution wherein essentially all the pores are of diameter greater than about 100 angstroms, less than about 10 percent of the total pore volume is in pores of diameter greater than about 300 angstroms, and at least about 60 percent, and preferably at least about 65 percent, of the total pore volume is in pores of diameter from about 180 to about 240 angstroms. Other physical properties of the catalyst typically include a total pore volume of usually less than about 1.2 cc/gram and a surface area greater than about 100 m$^2$/gram, with both properties determined by the conventional methods previously disclosed herein. Physical characteristics of the catalyst of the invention including pore size distribution, average pore diameter, surface area, total pore volume and average crush strength are summarized in Table I.

TABLE I

PHYSICAL CHARACTERISTICS OF CATALYST

| Pore Size Distribution | % of Total Pore Volume | | |
|---|---|---|---|
| | Broad | Preferred | Most Preferred |
| <100 | 0 | 0 | 0 |
| >140 | — | — | >95 |
| >150 | — | >90 | >90 |
| 180–240 | >60 | >65 | >70 |
| 180–220 | >30 | >40 | >50 |
| >240 | — | — | <25 |
| >300 | <10 | <10 | <10 |
| >500 | — | — | <6 |
| Average pore diameter, angstroms | >180 | 180–220 | 190–210 |
| Surface area, m$^2$/gram | >100 | 100–200 | 110–190 |
| Total pore volume, cc/gram | 0.25–1.2 | 0.4–0.9 | 0.45–0.8 |
| Average crush strength lbs / ⅛ inch | >4 | >7 | >10 |

A highly preferred catalyst of the invention contains about 2 to about 6 weight percent of Group VIII metal components, calculated as the monoxide, and from 10 to about 16 weight percent of Group VIB metal components, calculated as the trioxide, on a porous refractory oxide support consisting essentially of gamma alumina. The most preferred Group VIII and Group VIB metals in this embodiment are cobalt and molybdenum, respectively. Physical characteristics of this catalyst include a total pore volume of about 0.6 to about 0.8 cc/gram, a surface area from about 110 to about 190 m$^2$/gram and an average pore diameter from about 190 to about 210 angstroms.

Another highly preferred catalyst of the invention contains about 2 to about 6 weight percent of Group VIII metal components, calculated as the monoxide, and from about 18 to about 26 weight percent of Group VIB metal components, calculated as the trioxide, on a porous refractory oxide consisting essentially of gamma alumina. Most preferably, the Group VIII metal is nickel and the Group VIB metal is tungsten. Physical properties of this catalyst include a total pore volume of about 0.45 to about 0.75 cc/gram, a surface area between about 110 and 190 m$^2$/gram and an average pore diameter from about 190 to about 210 angstroms.

An unusual porosity feature of the catalyst is the combination of at least three critical characteristics. First, the catalyst is prepared so that few, if any, small pores are present. Essentially all the pores of the catalyst are of diameter greater than about 100 angstroms (e.g., essentially no micropores less than about 100 angstroms), preferably more than about 90 percent of the total pore volume is in pores of diameter greater than 150 angstroms, and most preferably more than about 95 percent of the total pore volume is in pores of diameter greater than about 140 angstroms. These relatively large pores in the catalyst provide essentially free access to the active catalytic sites for the large aromatic polycyclic molecules, such as asphaltenes, in which a substantial proportion of the metallic contaminants in hydrocarbon oil residua is usually contained. Second, less than 10 percent of the total pore volume of the catalyst is in pores of diameter greater than 300 angstroms, including preferably less than about 6 percent in pores of diameter greater than 500 angstroms, and more preferably less than 25 percent of the total pore volume being in pores of diameter greater than 240 angstroms. Minimizing the number of macropores (300 angstrom diameter or larger) in the catalyst contributes to maximizing the available surface area for active catalytic sites. Third, the catalyst has at least about 60 percent, preferably at least about 65 percent, and most preferably at least about 70 percent of the total pore volume in pores of diameter in the range from about 180 angstroms to about 240 angstroms. Since such a large percentage of the pore volume is distributed in medium-sized pores of diameter from about 180 to about 240 angstroms, the number of macropores and micropores is substantially minimized so that the bulk of the available surface area is distributed in the medium-sized pores. It is theorized, at least for hydrodemetallization purposes, that both the size and the substantial number of pores in the medium-size range allows for both ready penetration into the catalyst by relatively large metals-containing molecules and deposition of a significant amount of contaminant metals on the walls and mouth of each pore; and invention, however, is not limited to this or any other theory of operation.

An unusual feature of the catalyst of the invention is the more efficient utilization of the pore volume of the catalyst particles as evidenced by similar contaminant metals concentration on the exterior surface of a particle and at a substantial depth within the particle. Such similar metals concentrations may be determined analytically using a scanning electron microscope (SEM) to produce line scans traversing a cross-sectional plane of a catalyst particle between a point on its exterior surface and a point at a substantial depth within. For preferred catalyst particles having at least one symmetrical cross-section, a substantial depth is determined by reference to a perpendicular plane bisecting the longest axis of symmetry. On this cross-section, those points which are everywhere equidistant from the perimeter while defining a similar shape as the cross-section but encompassing only 25 percent of its area are points which are considered herein to lie at a substantial depth within the particle. Line scan examinations of such cross-sections after the particles have been removed during a hydroprocessing run, as well as at or near the end of the run, reveal that the concentration of contaminant metals at the described depth will typically average at least 75 percent, preferably between 85 and 125 percent, and most preferably between 90 and 110 percent of the concentration of the contaminant metals on the surface of the particle. The same relative percentages of metals concentration between the exterior and an internal depth location apply to corresponding points on surfaces of imaginary internal and actual exterior volumes of similar shape for catalyst particles having no symmetrical cross-section. However, the depth within the particle is determined from the imaginary internal volume, having a surface of points everywhere equidistant from corresponding points on the actual exterior of the particle, but encompassing only 50 percent of the actual exterior volume of the particle. It is theorized that the superior activity and/or stability properties of the catalyst of the invention for promoting the hydroprocessing of hydrocarbon oils is attributable in part to a more efficient utilization of the pore volume for allowing penetration and accumulation of contaminant metals. Such relative percentages of metals concentrations have been found to particularly pertain to the catalyst of the invention when utilized in a first reactor in the hydroprocessing of a hydrocarbon oil when at least about 35 percent of the total pore volume is distributed in pores of diameter in a preferred range of about 180 to about 220 angstroms.

Catalysts prepared in accordance with the invention are employed under hydroprocessing conditions suited for their intended purposes, as for example, in a process for upgrading hydrocarbon oils such as hydrocracking, hydrotreating, hydrodemetallization, or hydrodesulfurization with usual conditions being an elevated temperature above 600° F., a pressure above 500 p.s.i.g., and the presence of hydrogen. Such catalysts are also activated in accordance with methods suited to such catalysts. As an illustration, most hydroprocessing catalysts are more active, sometimes even far more active, in a sulfided or reduced form than in the oxide form in which they are generally prepared. Accordingly, hydroprocessing catalysts prepared in accordance with the invention may be sulfided or reduced prior to use (in which case the procedure is termed "presulfiding" or "prereducing") by passing a sulfiding or reducing gas, respectively, over the catalyst prepared in the calcined form. Temperatures between 300° F. and 700° F. and space velocities between about 150 and 500 v/v/hr are generally employed, and this treatment is usually continued for about two hours. Hydrogen may be used to prereduce the catalyst while a mixture of hydrogen and one or more components selected from the group consisting of sulfur vapor and the sulfur compounds (e.g., lower molecular weight thiols, organic sulfides, and especially $H_2S$) is suitable for presulfiding. Generally speaking, the relative proportion of hydrogen in the presulfiding mixture is not critical, with any proportion of hydrogen ranging between 1 and 99 percent by volume being adequate.

If the catalyst is to be used in a sulfided form, it is preferred that a presulfiding procedure be employed. However, since many hydroprocessing catalysts are used to upgrade sulfur-containing hydrocarbons, as in hydrodesulfurization, one may, as an alternative, accomplish the sulfiding in situ, particularly with hydrocarbon oils containing about 1.0 weight percent or more of sulfur under conditions of elevated temperature and pressure.

Preferably the catalyst is employed in a process for the hydrodesulfurization of hydrocarbon oils, particularly where the process also emphasizes a high degree of hydrodemetallization and/or hydroconversion of asphaltenes. The catalyst is usually employed as either a fixed or fluidized bed of particulates in a suitable reactor vessel wherein the oils to be treated are introduced and subjected to elevated conditions of pressure and temperature, and a substantial hydrogen partial pressure, so as to effect the desired degree of desulfurization, denitrogenation, asphaltene conversion and demetallization. Most usually, the catalyst is maintained as a fixed bed with the oil passing downwardly therethrough. It is highly preferred that the catalyst be utilized in a train of several reactors required for severe hydrodesulfurization, as for example, in a multiple train reactor system having one or two reactors loaded with the catalyst of the invention and the remaining reactors with one or more other hydroprocessing catalysts. Alternatively, the catalyst of the invention may be loaded in a single reactor together with one or more other hydroprocessing catalysts. The catalyst of the invention is employed alone or with other hydroprocessing catalysts in reactors that are generally operated under the same or an independent set of conditions selected from those shown in the following Table II:

TABLE II

| Operating Conditions | Suitable Range | Preferred Range |
| --- | --- | --- |
| Temperature, °F. | 500–900 | 600–850 |
| Hydrogen Pressure, p.s.i.g. | 500–3,000 | 1,000–2,500 |
| Space Velocity, LHSV | 0.05–3.0 | 0.1–1.5 |
| Hydrogen Recycle Rate, scf/bbl | 1,000–15,000 | 2,000–10,000 |

Contemplated for treatment by the process employing the catalyst of the invention are hydrocarbon-containing oils, herein referred to generally as "oils," including broadly all liquid and liquid/vapor hydrocarbon mixtures such as crude petroleum oils and synthetic crudes. Among the typical oils contemplated are top crudes, vacuum and atmospheric residual fractions, heavy vacuum distillate oils, shale oils, oils from bituminous sands, coal compositions, and the like, which contain sulfur and one or more of such contaminant metals as vanadium, nickel, iron, sodium, zinc, and copper. Typically, sulfur and metals-containing hydrocarbon oils, preferably containing at least about one weight percent of sulfur and in excess of 2 ppmw of total contaminant metals, are treated in the presence of the catalyst of the invention. Since the metallic poisons which deactivate hydrocarbon refining catalysts are generally associated with the asphaltene components of the oil, the catalyst will be more commonly employed during the hydroprocessing of the higher boiling fractions (e.g., residua) in which the asphaltene components concentrate. The process utilizing the catalyst of the invention is especially useful for treating oils containing more than about 25 ppmw, and preferably, more than 100 ppmw of nickel plus vanadium contaminant metals, and between about 1 and 8 weight percent or more of sulfur, as for example, atmospheric and vacuum distillation residua which contain a substantial proportion of asphaltenes. The typical residuum for treatment herein is high boiling (i.e., at least 95% of its constituents boil above about 600° F.) and often contains undesirable proportions of nitrogen, usually in a concentration between about 0.2 and 0.4% by weight. Such sulfur, nitrogen, asphaltene and metals-containing oils commonly have an API gravity less than about 30°, and usually less than about 25°.

In a preferred embodiment of the invention, a hydrocarbon oil is successively passed through at least two reaction zones, each containing a different hydroprocessing catalyst, at a temperature of about 500° F. to about 900° F. and at a LHSV of about 0.05 to about 3.0 and in the presence of hydrogen at a partial pressure about 500 to about 3,000 p.s.i.g., employed at a recycle rate of about 1,000 to about 15,000 scf/bbl. Although the catalyst of the invention may be employed in either the first or second reaction zone, preferably it is utilized in the first reaction zone. The catalyst of the invention is usually employed to promote a high degree at demetallization of the hydrocarbon oil while also maintaining a suitable degree of desulfurization. Conversely, the second hydroprocessing catalyst, while maintaining a suitable degree of demetallization, is primarily employed to promote a high degree of desulfurization so that the effluent hydrocarbon oil from the second reaction zone has a substantially reduced sulfur and contaminant metals content. Usually the second catalyst contains one or more hydrogenation metal components on a porous refractory oxide support material, and as compared to the catalyst of the invention, has both (1) a lower percentage of the total pore volume in pores of diameter from about 180 to about 220 angstroms and (2) a lower average pore diameter (i.e., below about 180 angstroms).

In another preferred embodiment of the invention, a hydrocarbon oil containing at least about 50 ppmw of total contaminant metals is first contacted at a temperature about 600° F. to about 850° F. and at a LHSV about 0.1 to about 1.5 with a catalyst of the invention having a substantial capacity for accumulating contaminant metals. The resultant product is subsequently contacted with a second catalyst capable of removing both sulfur and contaminant metals. The second catalyst has at least about 80 percent of the total pore volume in pores of diameter from about 100 angstroms to about 200 angstroms and a surface area from about 100 m$^2$/gram to about 200 m$^2$/gram. The hydrocarbon oil is contacted with both catalysts, in two stage operation, in the presence of hydrogen at a partial pressure about 1,000 to about 2,500 p.s.i.g. and employed at a recycle rate of about 2,000 to about 10,000 scf/bbl. The other catalyst has an average pore diameter at least about 15 angstroms smaller than the demetallization catalyst of the invention and also has a lower percentage of the total pore volume in pores of diameter from about 180 to about 220 angstroms. Both catalysts contain one or more Group VIII metal components and/or one or more Group VIB metal components on an alumina-containing porous refractory oxide material so that essentially all pores are of diameter greater than 100 angstroms, with less than 10 percent of the total pore volume being in pores of diameter greater than 300 angstroms, and with at least about 35 percent of the total pore volume being in pores of diameter from about 150 angstroms to about 200 angstroms. The product hydrocarbon obtained from this two-stage process typically contains at least about 60 percent, and often contains at least 85 percent less contaminant metals and sulfur than the hydrocarbon oil feedstock.

The catalyst of the invention has a capacity for accumulating a substantial amount of contaminant metals from a metals-containing hydrocarbon oil during hydroprocessing. Although contaminant metals are continuously deposited on the surface and in the pores of the catalyst during the course of hydroprocessing, the useful life of the catalyst may be maintained until the catalyst has gained weight due to accumulated contaminant metals, calculated as the free metals, to the extent of at least about 25 weight percent, usually at least about 50 weight percent, and often times at least about 100 weight percent of the weight of the original catalyst in the oxide form. (I.e., calculated as the free metals, the contaminant metals deposited in the catalyst increase the catalyst weight in the oxide form to a factor of at least about 1.25, usually at least about 1.50 and often times at least about 2.00.)

The invention is further illustrated by the following examples which are illustrative of specific modes of practicing the invention and are not intended as limiting the scope of the invention defined by the appended claims.

EXAMPLE I

Catalyst A, prepared in accordance with the invention, is tested to determine its demetallization activity against a reference catalyst consisting of particles of a commercially available demetallization catalyst.

Catalyst A is prepared as follows: 96 grams of alumina support particles having the physical characteristics summarized in TABLE III are impregnated with 85 ml of an aqueous solution containing 17 grams of ammonium heptamolybdate [$(NH_4)_6 Mo_7 O_{24}.4H_2O$] and 17.5 grams of cobalt nitrate [$Co(NO_3)_2.6H_2O$]. After aging for 2 hours, the catalyst is dried at 110° C. and calcined at 1,200° F. in flowing air. A final catalyst is produced having a nominal composition as follows: 12.0 weight percent of molybdenum components, calculated as $MoO_3$, 4.0 weight percent of cobalt components, calculated as CoO, with the balance comprising gamma alumina.

The reference catalyst is a commercially available demetallization catalyst and is produced having a nominal composition as follows: 12.0 weight percent of molybdenum components, calculated as $MoO_3$, 4.0 weight percent of cobalt components, calculated as CoO, with the balance consisting essentially of silica-containing gamma alumina, the $SiO_2$ content being about 1.0 weight percent of the entire catalyst and about 1.2 weight percent of the support.

The final catalysts, A and the reference catalyst, and the alumina support from which Catalyst A is prepared, have the physical characteristics summarized in Table III.

TABLE III

PHYSICAL CHARACTERISTICS

| Pore Diameter, Angstroms | Reference Catalyst Pore Volume cc/gram | % of Total p.v. | Catalyst A Pore Volume cc/gram | % of Total p.v. | Alumina Support Pore Volume cc/gram | % of Total p.v. |
|---|---|---|---|---|---|---|
| <40 | 0 | 0 | 0 | 0 | 0 | 0 |
| 40-60 | .19 | 37 | 0 | 0 | 0 | 0 |
| 60-80 | .12 | 23 | 0 | 0 | 0 | 0 |
| 80-100 | .03 | 5 | 0 | 0 | 0 | 0 |
| 100-120 | .005 | 1 | 0 | 0 | .03 | 4 |
| 120-140 | .005 | 1 | .02 | 3 | .06 | 7 |
| 140-160 | .005 | 1 | .04 | 5 | .27 | 32 |
| 160-180 | .002 | 1 | .07 | 10 | .18 | 21 |
| 180-200 | .002 | 0 | .13 | 18 | .12 | 15 |
| 200-220 | .002 | 0 | .25 | 35 | .06 | 7 |
| 220-240 | .002 | 0 | .10 | 14 | .04 | 4 |
| 240-260 | .002 | 1 | .03 | 4 | .01 | 2 |
| 260-280 | .002 | 0 | .01 | 1 | .015 | 1 |
| 280-300 | .003 | 1 | .015 | 2 | .005 | 1 |
| 300-400 | .007 | 1 | .02 | 2 | .01 | 1 |
| 400-500 | .005 | 1 | 0 | 0 | .01 | 1 |
| <500 | .14 | 27 | .04 | 6 | .03 | 4 |
| TOTAL PORE VOLUME | 0.52 | | 0.725 | | .84 | |
| SURFACE AREA m²/gram | 300 | | 140 | | 153 | |

Catalyst A and the reference catalyst are each presulfided for about 16 to about 20 hours by contact with a gas consisting of 90 volume percent $H_2$ and 10 volume percent $H_2S$ flowing at 4.4 SCFH at one atmosphere pressure. The temperature during the presulfiding is initially at room temperature, is increased gradually until 700° F. is reached, and then lowered to 550° F., at which time the catalyst is contacted with the feedstock.

Catalyst A and the reference catalyst are then tested to determine their hydrodemetallization and hydrodesulfurization activities and temperature increase requirements (TIR), i.e., stability (or resistance to deactivation). The presulfided catalysts, A and the reference, are each charged in separate runs to a reactor and utilized at 740° F. to hydrodesulfurize an Iranian atmospheric residua feedstock having the characteristics shown in Table IV below under the following conditions: 2,000 p.s.i.g. total pressure, 1.0 LHSV, a mass velocity of 220 lbs/hr ft² and a hydrogen rate of 6,000 SCF/B.

TABLE IV

FEEDSTOCK PROPERTIES

| Feed Description | Iranian Atmospheric Residua |
|---|---|
| Gravity, °API | 16.6 |
| Sulfur, wt. % | 2.61 |
| Nitrogen, wt. % | 0.347 |
| Vanadium, ppm | 113 |
| Nickel, ppm | 37 |
| Ash, ppm | 230 |
| Carbon Residue, D-189, wt. % | 6.9 |
| Asphaltenes, (UTM-86), wt. % | 6.1 |
| Pour Point, °F. | +65 |
| ASTM D-1160 Distillation, °F. | |
| IBP | 505 |
| 5 | 627 |
| 10 | 682 |
| 20 | 753 |
| 30 | 820 |
| 40 | 872 |
| 50 | 942 |
| 60 | 1,033 |
| Max | 1,035 |
| Rec | 61.0 |

A portion of the feedstock is passed downwardly through each reactor and contacted with the described catalysts in a single-stage, single-pass system with once-through hydrogen such that the effluent metals concentrations is maintained at about 15 ppm, equivalent to about 90 percent demetallization. The calculated temperatures required for this conversion, as adjusted from actual operating reactor temperatures, is summarized in Table V.

TABLE V

DEMETALLIZATION TEMPERATURES REQUIRED, °F.

| Catalysts | 5 Days | 10 Days | 15 Days | 20 Days | 25 Days | 30 Days |
|---|---|---|---|---|---|---|
| A | 746 | 757 | 764 | 769 | 773 | 775 |
| Ref | 760 | 776 | 785 | 793 | 797 | 805 |

In view of the data in Table V relative to demetallization of the feedstock, catalyst A is noticeably more active than the reference catalyst during the entire run. After 30 days, catalyst A is about 30° F. more active than the reference catalyst.

EXAMPLE II

Catalyst B, prepared in accordance with the invention, is tested to determine its demetallization activity against the reference catalyst of Example I. Catalyst B is prepared in the same manner as Catalyst A of Example I except 12.5 grams of citric acid are also contained in the aqueous impregnation solution. A final catalyst is produced having the same nominal composition of molybdenum, cobalt and alumina as Catalyst A of Example I and having the physical characteristics summarized in TABLE VI.

TABLE VI

PHYSICAL CHARACTERISTICS

Catalyst B

| Pore Diameter, Angstroms | Pore Volume cc/gram | % of Total p.v. |
|---|---|---|
| <100 | 0 | 0 |
| 100–200 | .005 | 1 |
| 120–140 | .01 | 1 |
| 140–160 | .03 | 5 |
| 160–180 | .04 | 6 |
| 180–200 | .11 | 16 |
| 200–220 | .17 | 25 |
| 220–240 | .15 | 22 |
| 240–260 | .07 | 11 |
| 260–280 | .02 | 3 |
| 280–300 | .02 | 3 |
| 300–400 | .025 | 3 |
| 400–500 | .01 | 2 |
| >500 | .01 | 2 |
| TOTAL PORE VOLUME | 0.67 | |
| SURFACE AREA $m^2$/gram | 136 | |

The reference catalyst and catalyst B are tested with the same feedstock in the same manner as Example I, except the condition of mass velocity is 400 lbs/hr ft$^2$. The calculated temperatures required for about 90 percent demetallization, as adjusted from actual operating temperatures, is summarized in Table VII.

TABLE VII

DEMETALLIZATION TEMPERATURES REQUIRED, °F.

| Catalysts | 5 Days | 10 Days | 20 Days | 30 Days | 40 Days |
|---|---|---|---|---|---|
| B | 735 | 752 | 770 | 777 | 785 |
| Ref | 751 | 766 | 782 | 790 | 798 |

In view of the data in Table VII relative to demetallization of the feedstock, catalyst B is noticeably more active than the reference catalyst during the entire run. During essentially the entire run of 40 days, catalyst B is between about 12° F. and 16° F. more active than the reference catalyst.

EXAMPLE III

Catalyst A of Example I is tested for 227.5 consecutive days at various conditions to determine its capacity for accumulating contaminant metals from metals containing hydrocarbon oils.

The catalyst is presulfided in the same manner as described in Example I, then contacted for the first 125.1 days with the Iranian feedstock having the same characteristics as in Example I and subsequently contacted for another 102.4 days with a Kuwait feedstock having the characteristics shown in Table VIII below.

TABLE VIII

FEEDSTOCK PROPERTIES

| Feed Description | Kuwait Atmospheric Residua |
|---|---|
| Gravity, °API | 16.8 |
| Sulfur, wt. % | 3.70 |
| Nitrogen, wt. % | 0.207 |
| Vanadium, ppm | 49 |
| Nickel, ppm | 14 |
| Ash, ppm | — |
| Carbon Residue, D-189, wt. % | 8.7 |

TABLE VIII-continued

FEEDSTOCK PROPERTIES

| Feed Description | Kuwait Atmospheric Residua |
|---|---|
| Asphaltenes, (UTM-86), wt. % | 6.9 |
| Pour Point, °F. | +30 |
| ASTM D-1160 Distillation, °F. | |
| IBP | 487 |
| 5 | 610 |
| 10 | 664 |
| 20 | 739 |
| 30 | 805 |
| 40 | 863 |
| 50 | 937 |
| 60 | 1,028 |
| Max | 1,108 |
| Rec | 73.0 |

The presulfided catalyst is charged to a reactor and utilized at 740° F. to demetallize the feedstocks under the conditions of 2,250 p.s.i.g. total pressure and a hydrogen rate of 10,000 SCF/B. A portion of the feedstock is passed downwardly through the reactor and contacted with the catalyst in a single-stage, single-pass system with once-through hydrogen such that effluent metals concentrations are maintained at about 15 ppm over the first 125.1 days of the run with the Iranian feedstock and at about 6 ppm over the remainder of the run (102.4 days) with the Kuwait feedstock, i.e., equivalent to about 90 percent demetallization.

The calculated temperatures for about 90 percent demetallization, as adjusted for actual operating reactor temperature, at different space velocities (LHSV) for indicated time intervals during the 227.5 day run are summarized below in Table VIII. The original catalyst, in the monoxide and trioxide form of the cobalt and molybdenum metals, respectively, exhibits an increase in weight during the 227.5 days of the run, due to the additional weight of the deposited contaminant metals, calculated as the free metals. The average percentage of weight increase of the catalyst, due to contaminant metals deposition, for the indicated time intervals, as compared to the original catalyst weight, is also summarized in TABLE IX.

TABLE IX

| Days of Run | Feedstock | LHSV | Temp. for 90% Demetallization | Average Weight Percent Increase of Catalyst Due to Metals Deposition |
|---|---|---|---|---|
| 1 | Iranian | 1.0 | 746 | |
| 30 | (Table VII) | 1.0 | 780 | 18.0 |
| 31 | | 0.5 | 744 | |
| 40 | | 0.5 | 745 | 21.0 |
| 41 | | 1.0 | 782 | |
| 50 | | 1.0 | 783 | 24.5 |
| 51 | | 0.5 | 746 | |
| 125.1 | | 0.5 | 778 | 45.5 |
| 125.1 | Kuwait | 0.5 | 768 | |
| 140 | (Table VIII) | 0.5 | 769 | 47.0 |
| 141 | | 0.6 | 781 | |
| 179 | | 0.6 | 775 | 50.5 |
| 180 | | 1.2 | 824 | |
| 227.5 | | 1.2 | 830 | 65.5 |

In view of the data in TABLE IX catalyst A exhibits a capacity for accumulating a substantial amount of contaminant metals from metals-containing hydrocarbon feedstocks. After 227.5 days, during which catalyst A is utilized for hydroprocessing the metals-containing feedstocks, approximately a 65.5 average weight percent increase in catalyst A is observed, due to the accumulation of contaminant metals on the catalyst. Furthermore, even after 227.5 days there is no sign of much change in the effluent metals concentrations as indicated by only a 6° F. increase over the last 47.5 days of the run.

The final average percentage of deposited metals may be determined from analysis of samples of catalyst removed from the top, middle and bottom portions of the reactor after 227.5 days. Analysis of samples of catalyst A removed from the top of the catalyst bed reveal a contaminant metals deposition that is about 101 weight percent of original catalyst A, i.e., the metals deposition has increased the catalyst weight by more than a factor of 2, and specifically by about 2.01.

While particular embodiments of the invention have been described, it will be understood, of course, that the invention is not limited thereto since many obvious modifications can be made, and it is intended to include within this invention any such modifications as will fall within the scope of the invention as defined by the appended claims.

I claim:

1. A catalyst comprising one or more active metal components on a porous refractory oxide, said catalyst having at least about 60 percent of the total pore volume distributed in pores of diameter from about 180 angstroms to about 240 angstroms, with essentially all pores being of diameter greater than about 100 angstroms, and with less than about 10 percent of the total pore volume being in pores of diameter greater than 300 angstroms.

2. The catalyst defined in claim 1 wherein said active metal components comprise Group VIB and Group VIII metals.

3. The catalyst defined in claim 2 wherein said Group VIB metal is selected from the group consisting of molybdenum and tungsten.

4. The catalyst defined in claim 2 wherein said Group VIII metal is selected from the group consisting of cobalt and nickel.

5. The catalyst defined in claim 1 having a surface area greater than about 100 m²/gram.

6. The catalyst defined in claim 1 with an average pore diameter greater than about 180 angstroms.

7. The catalyst defined in claim 2 further comprising up to about 10 weight percent of Group VIII metal components, calculated as the monoxides, and up to about 30 weight percent of Group VIB metal components, calculated as the trioxides.

8. The catalyst defined in claim 1 having an average pore diameter from about 180 angstroms to about 220 angstroms.

9. The catalyst defined in claim 1 having a surface area from about 100 m²/gram to about 200 m²/gram.

10. The catalyst defined in claim 1 having a total pore volume from about 0.25 cc/gram to about 1.2 cc/gram.

11. The catalyst defined in claim 1 with at least about 65 percent of the total pore volume being in pores of diameter from about 180 angstroms to about 240 angstroms.

12. The catalyst defined in claim 1 with greater than about 90 percent of the total pore volume being in pores of diameter greater than about 150 angstroms.

13. The catalyst defined in claim 1 wherein said porous refractory oxide comprises alumina.

14. The catalyst defined in claim 13 wherein said alumina consists essentially of gamma alumina.

15. The catalyst defined in claim 1 having a capacity for accumulating contaminant metals from a metals-containing hydrocarbon oil such that the weight of said catalyst is increased by at least about 25 percent due to accumulated contaminant metals, calculated as the free metals.

16. The catalyst defined in claim 1 with less than about 25 percent of the total pore volume being in pores greater than about 240 angstroms.

17. A catalyst comprising at least one active Group VIB metal component on a porous refractory oxide comprising alumina, said catalyst with an average pore diameter greater than about 180 angstroms, with at least about 60 percent of the total pore volume distributed in pores of diameter from about 180 angstroms to about 240 angstroms, with essentially all the pores being of diameter greater than about 100 angstroms, and with less than about 10 percent of the total pore volume being in pores of diameter greater than about 300 angstroms.

18. The catalyst defined in claim 17 wherein said alumina consists essentially of gamma alumina.

19. The catalyst defined in claim 17 wherein said porous refractory oxide contains at least about 90 weight percent of alumina.

20. The catalyst defined in claim 17 wherein less than about 25 percent of the total pore volume being in pores of diameter greater than about 240 angstroms.

21. The catalyst defined in claim 17 wherein said Group VIB metal is selected from the group consisting of molybdenum and tungsten.

22. The catalyst defined in claim 17 further comprising at least one Group VIII metal component.

23. The catalyst defined in claim 22 wherein said Group VIII metal is selected from the group consisting of cobalt and nickel.

24. The catalyst defined in claim 22 wherein said Group VIB metal comprises molybdenum and said Group VIII metal component comprises cobalt.

25. The catalyst defined in claim 22 wherein said Group VIB metal comprises tungsten and said Group VIII metal component comprises nickel.

26. The catalyst defined in claim 22 further comprising up to about 10 weight percent of Group VIII metal components, calculated as the monoxides, and up to about 30 weight percent of Group VIB metal components, calculated as the trioxides.

27. The catalyst defined in claim 17 having an average pore diameter from about 180 angstroms to about 220 angstroms.

28. The catalyst defined in claim 17 having a capacity for accumulating contaminant metals from a metals-containing hydrocarbon oil such that the weight of said catalyst is increased by at least about 50 percent due to accumulated contaminant metals, calculated as the free metals.

29. The catalyst defined in claim 17 having a surface area from about 100 m²/gram to about 200 m²/gram.

30. The catalyst defined in claim 17 having a total pore volume from about 0.4 cc/gram to about 0.9 cc/gram.

31. The catalyst defined in claim 17 with greater than about 95 of the total pore volume being in pores of diameter greater than about 140 angstroms.

32. A catalyst useful for removing contaminant metals from a hydrocarbon oil comprising a Group VIB and a Group VIII metal component on a porous refractory oxide consisting essentially of gamma alumina, said catalyst with an average pore diameter from about 180 to about 220 angstroms, with at least about 65 percent of the total pore volume distributed in pores of diameter from about 180 angstroms to about 240 angstroms, with essentially all the pores being of diameter greater than 100 angstroms, with greater than about 95 percent of the total pore volume being in pores of diameter greater than about 140 angstroms, with less than about 10 percent of the total pore volume being in pores of diameter greater than about 300 angstroms, with less than about 25 percent of the total pore volume being in pores of diameter greater than about 240 angstroms, with a surface area from about 100 m²/gram to about 200 m²/gram, and with a total pore volume between about 0.45 cc/gram and about 0.8 cc/gram.

33. The catalyst defined in claim 32 wherein said Group VIB metal is selected from the group consisting of molybdenum and tungsten.

34. The catalyst defined in claim 32 wherein said Group VIII metal is selected from the group consisting of cobalt and nickel.

35. The catalyst defined in claim 32 wherein said Group VIB metal comprises molybdenum and said Group VIII metal component comprises cobalt.

36. The catalyst defined in claim 32 wherein said Group VIB metal comprises tungsten and said Group VIII metal component comprises nickel.

37. The catalyst defined in claim 32 further comprising about 2 to about 6 weight percent of Group VIII metal components, calculated as the monoxides, and about 8 to about 26 weight percent of Group VIB metal components, calculated as the trioxides.

38. The catalyst defined in claim 32 having an average pore diameter from about 190 angstroms to about 210 angstroms.

39. The catalyst defined in claim 32 having a capacity for accumulating contaminant metals from said hydrocarbon oil such that the weight of said catalyst is increased by at least about 100 percent due to accumulated contaminant metals, calculated as the free metals.

40. A catalyst prepared with a porous refractory oxide support, said support comprising a narrow pore size distribution with essentially all pores being of diameter greater than about 100 angstroms, with less than about 10 percent of the total pore volume being in pores of diameter greater than 300 angstroms, and with at least about 60 percent of the total pore volume being in pores of diameter distributed over a narrow range of about 60 angstroms within the 100 angstrom range of about 140 to about 240 angstroms.

41. The catalyst defined in claim 40 wherein said support has a total pore volume from about 0.5 to about 2.0 cc/gram.

42. The catalyst defined in claim 40 wherein said support has a surface area greater than about 100 m²/gram.

43. The catalyst defined in claim 40 wherein said support has an average pore diameter greater than about 160 angstroms.

44. The catalyst defined in claim 40 further comprising up to 30 weight percent of a Group VIB metal component, calculated as the trioxide.

45. The catalyst defined in claim 40 further comprising up to 10 weight percent of a Group VIII metal component, calculated as the monoxide.

46. The catalyst defined in claim 40 wherein said support consists essentially of gamma alumina.

47. A method for preparing a catalyst comprising a porous refractory oxide support, said method comprises compounding one or more active metals with said support, said support comprising a narrow pore size distribution with essentially all pores being of diameter greater than about 100 angstroms, with less than about 10 percent of the total pore volume being in pores of diameter greater than 300 angstroms, and with at least about 60 percent of the total pore volume being in pores of diameter distributed over a narrow range of about 60 angstroms within the 100 angstrom range of about 140 to about 240 angstroms.

* * * * *